United States Patent [19]

Rumell

[11] 4,026,429
[45] May 31, 1977

[54] METHOD OF UNLOADING CONTAINER FROM TRANSPORT VEHICLE

[76] Inventor: James A. Rumell, 1518 Meadow Lane, Elkhart, Ind. 46514

[22] Filed: Dec. 9, 1975

[21] Appl. No.: 639,056

Related U.S. Application Data

[62] Division of Ser. No. 410,344, Oct. 29, 1973, Pat. No. 3,934,740.

[52] U.S. Cl. .............................. 214/152; 280/438 R
[51] Int. Cl.² ......................................... B60P 1/04
[58] Field of Search .......... 214/152, 505, 506, 517; 280/43.23, 80 B

[56] References Cited

UNITED STATES PATENTS

| | | |
|---|---|---|
| 2,304,418 | 12/1942 | McMurray ................. 280/43.23 X |
| 2,682,419 | 6/1954 | Wolf ............................ 280/80 B X |
| 2,953,410 | 9/1960 | Chaney ......................... 214/506 X |
| 3,303,950 | 2/1967 | Jones ................................ 214/505 |
| 3,370,726 | 2/1968 | Ijichi ................................ 214/506 |
| 3,606,059 | 9/1971 | Haberle ....................... 214/517 X |

Primary Examiner—Robert G. Sheridan
Attorney, Agent, or Firm—Leydig, Voit, Osann, Mayer & Holt, Ltd.

[57] ABSTRACT

An over the road transport vehicle and method of unloading its cargo container. The transport vehicle includes a chassis having a wheeled tandem support and a flatbed that is selectively positionable relative to the tandem and may be tilted on the tandem to permit a container supported thereon to be moved longitudinally off the flatbed to either ground level or to an elevated loading platform.

11 Claims, 19 Drawing Figures

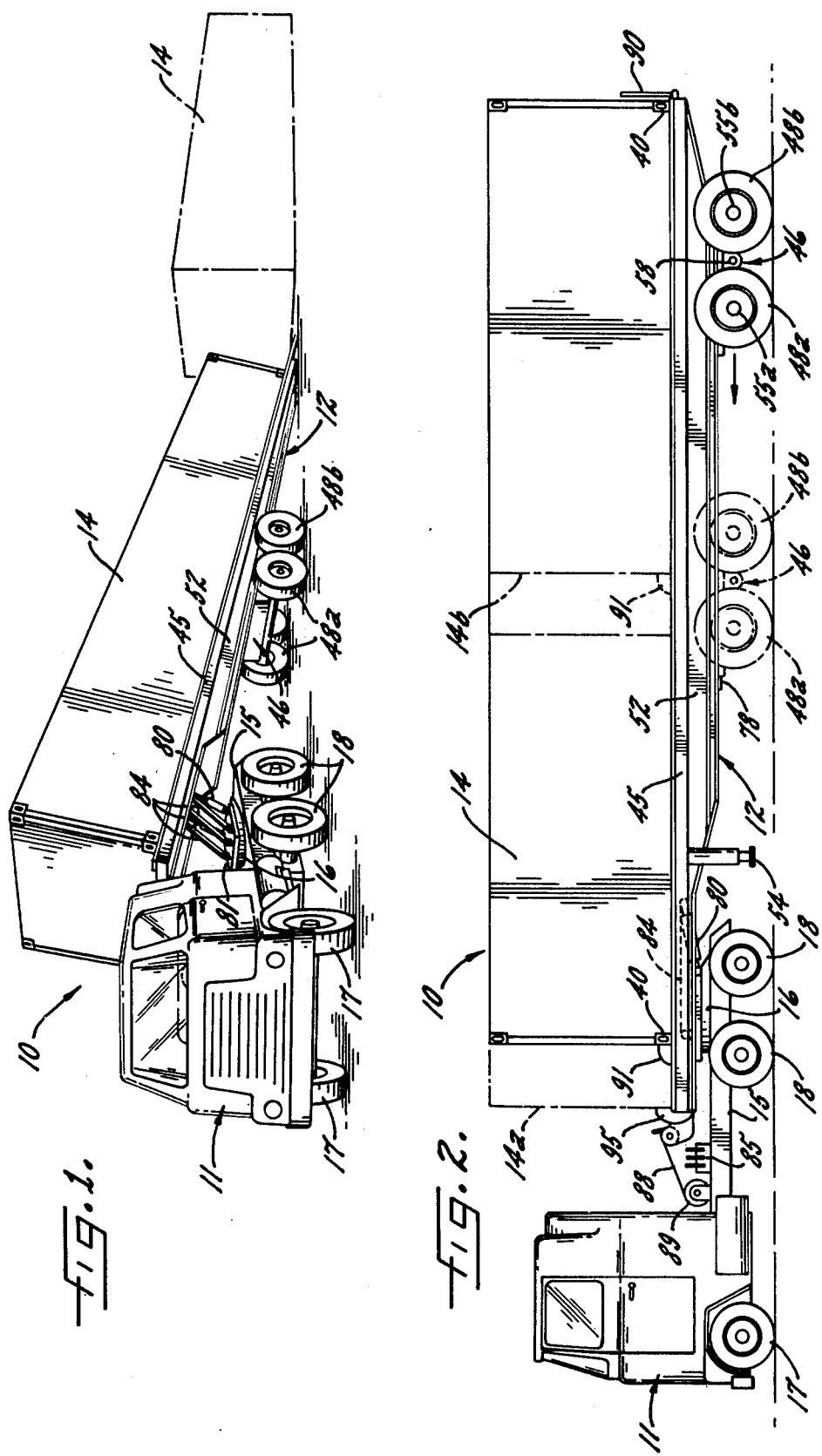

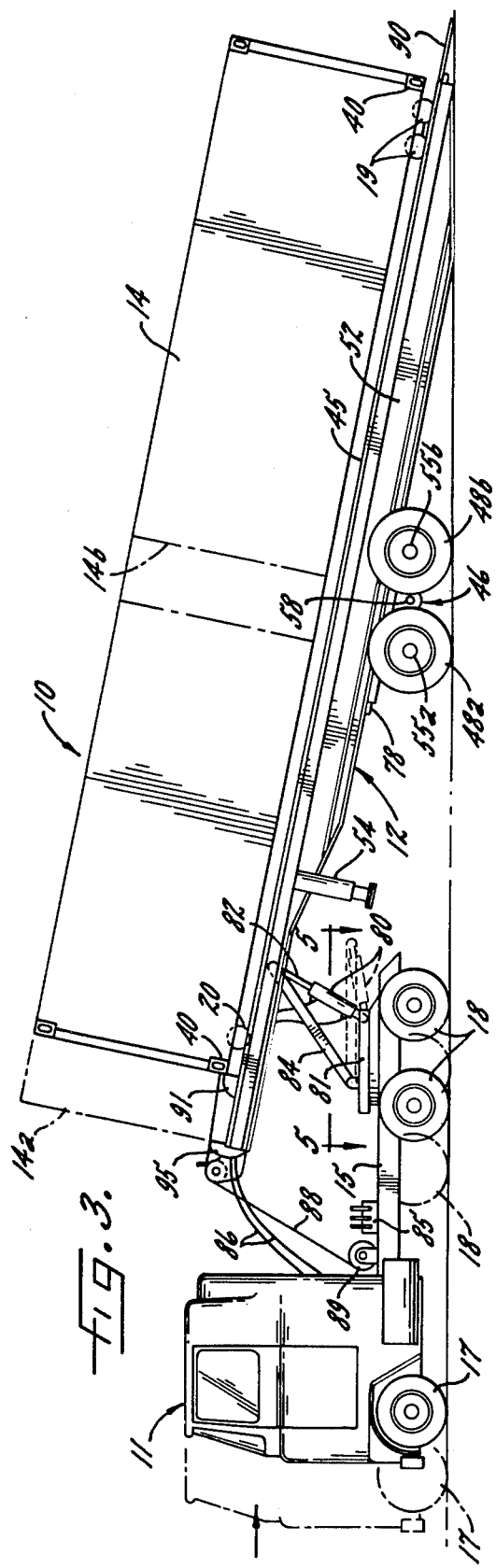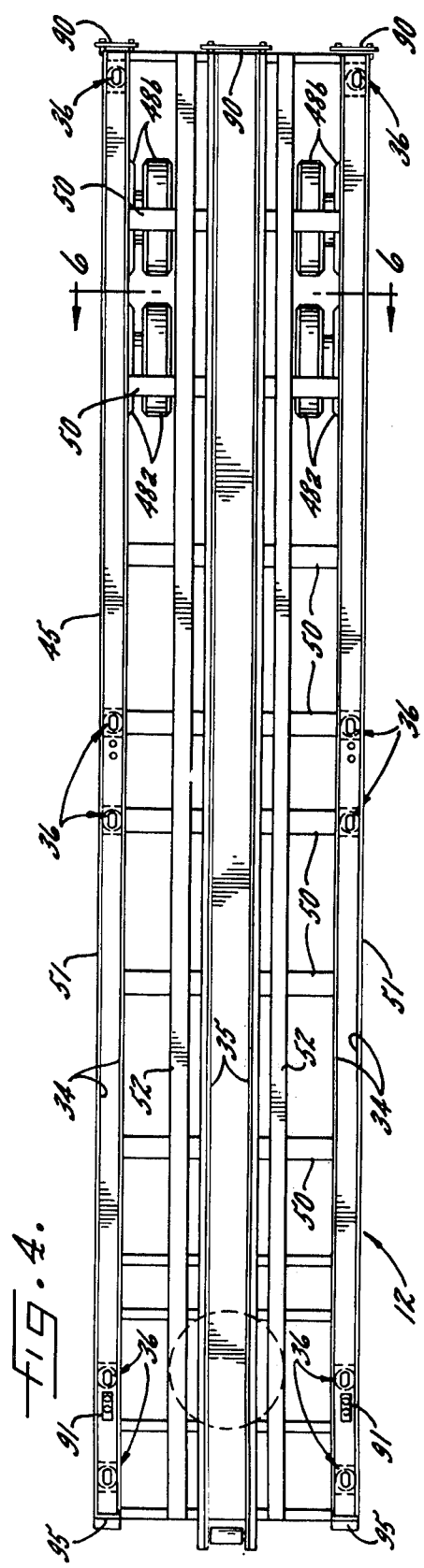

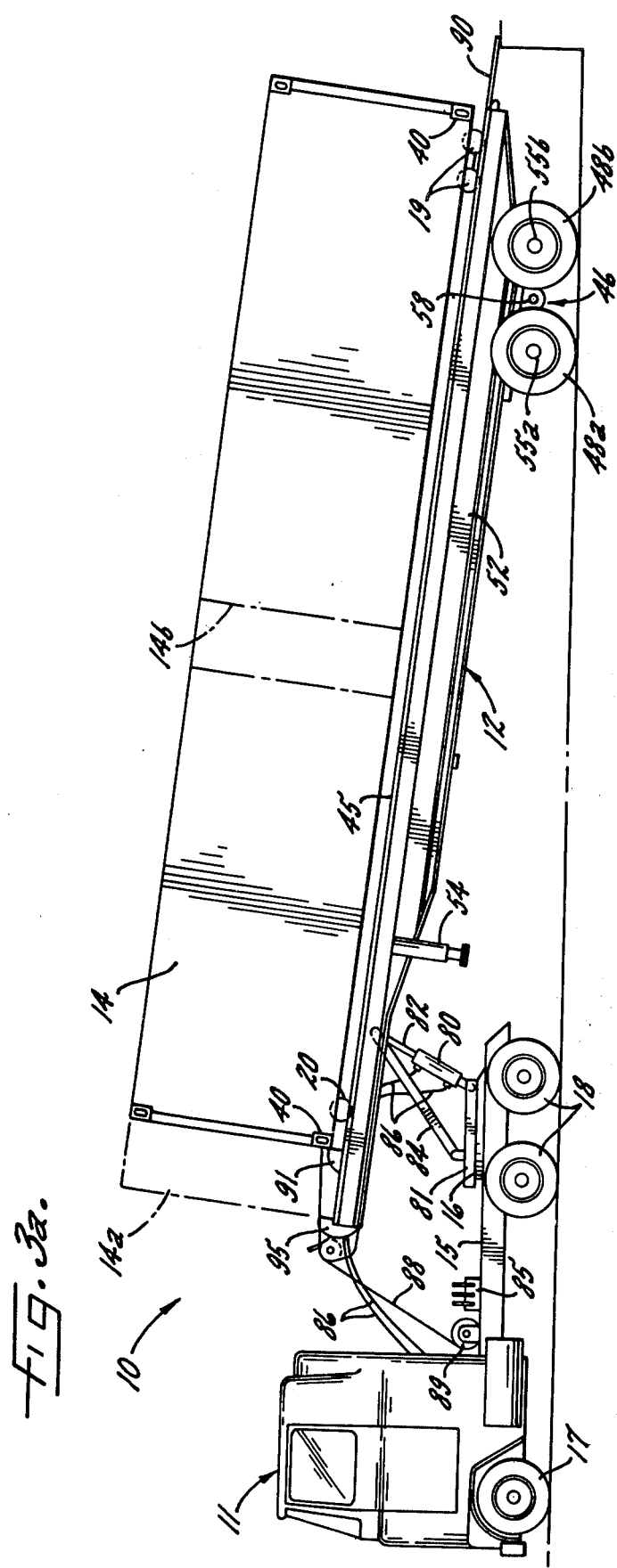

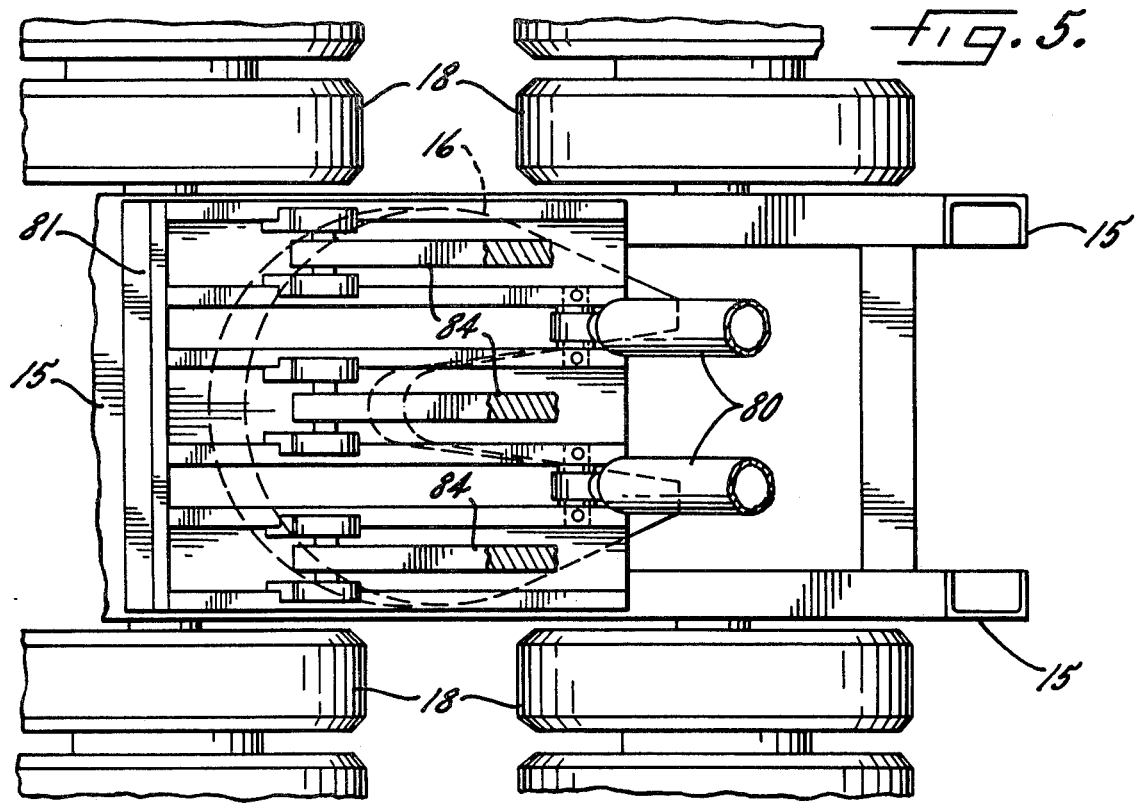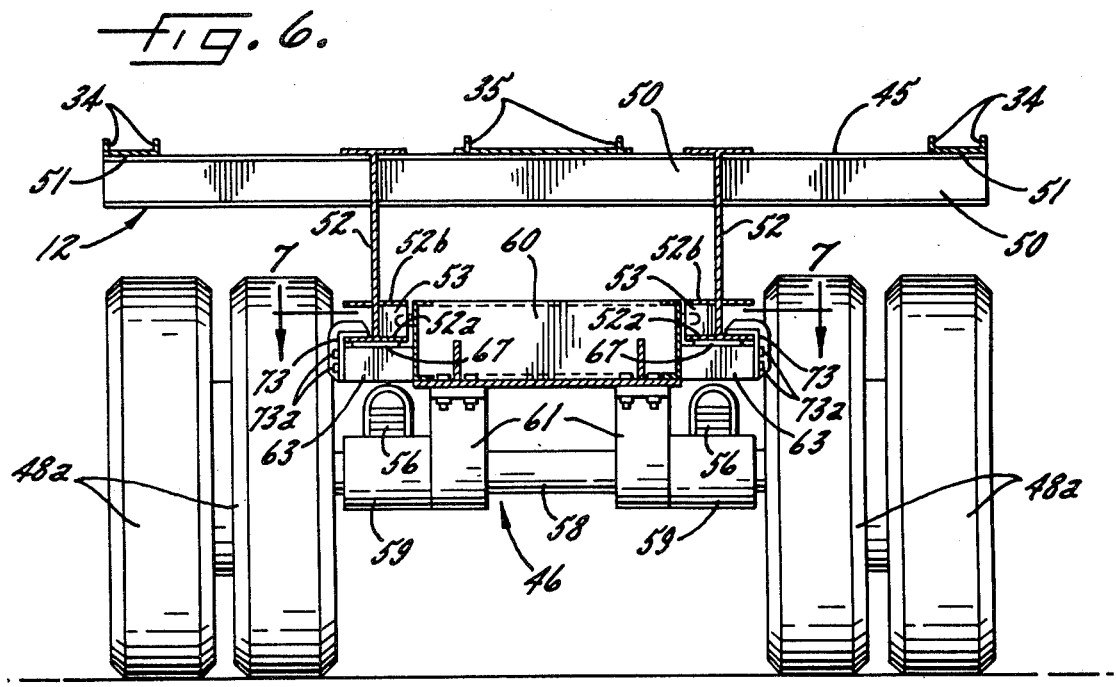

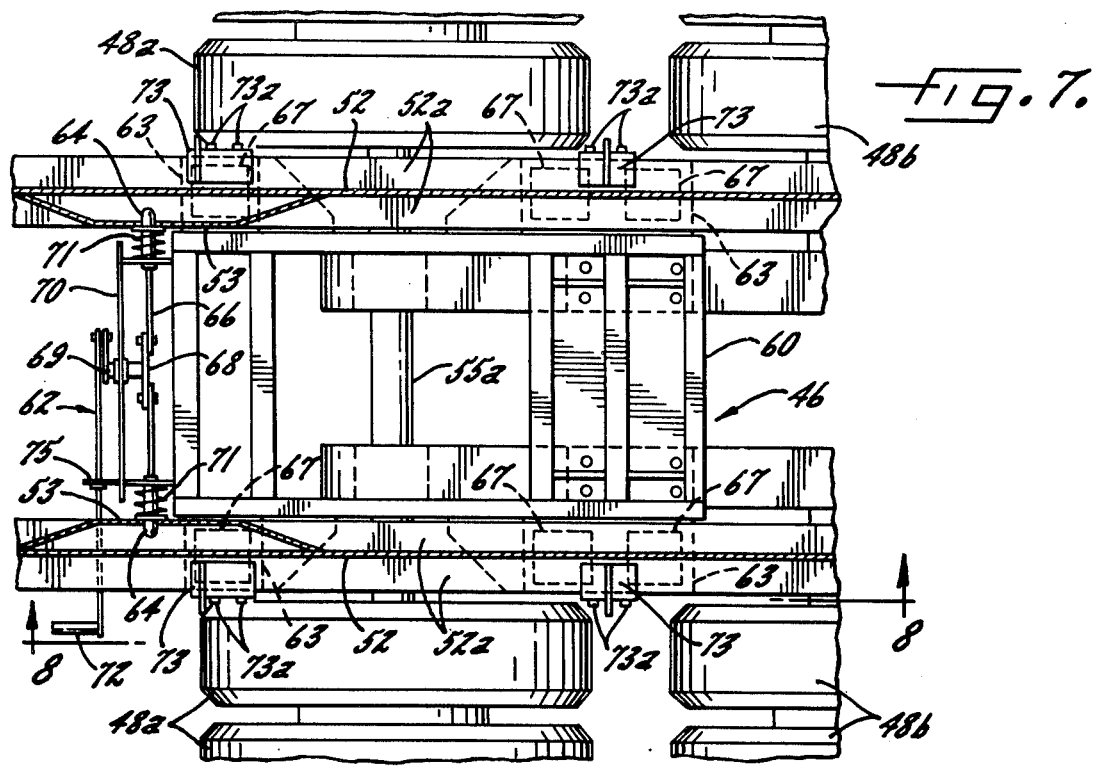
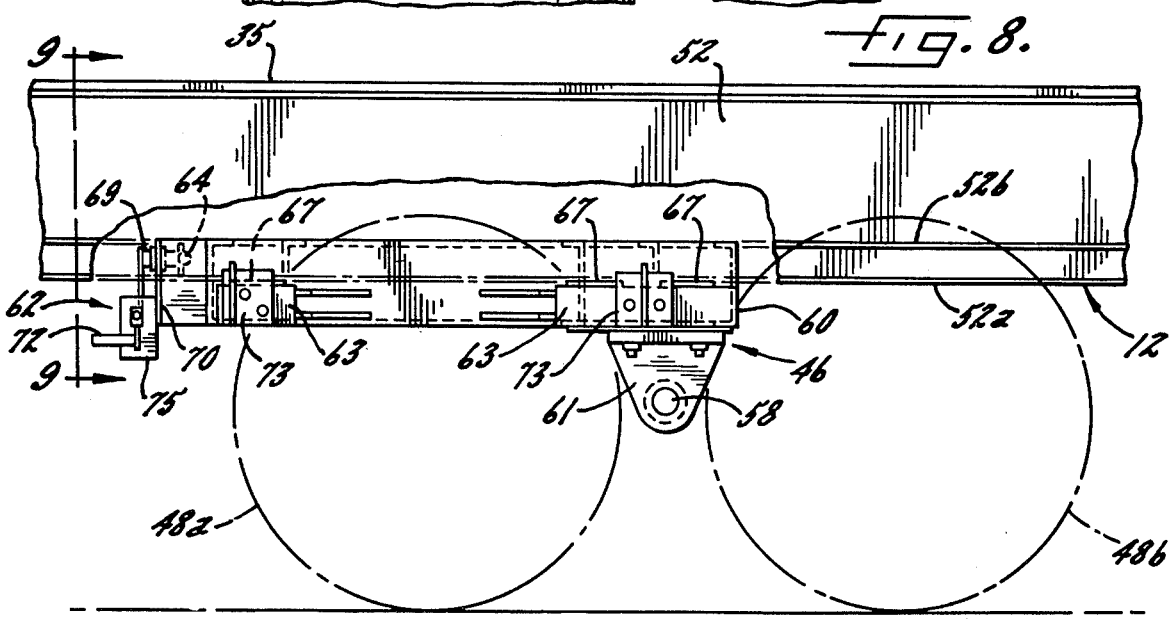
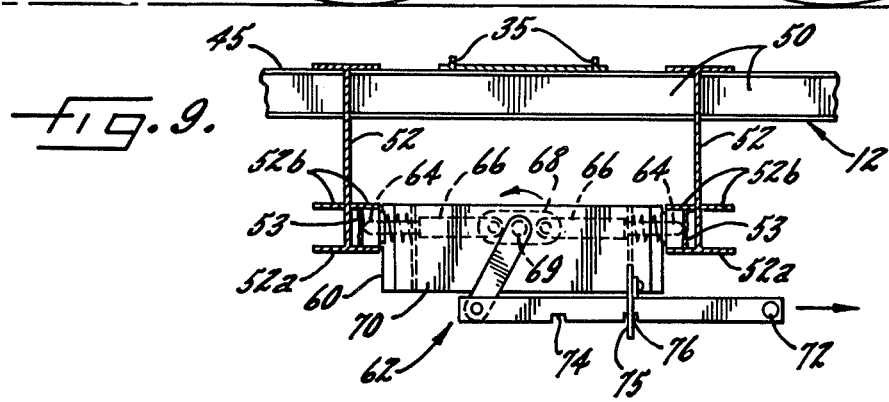

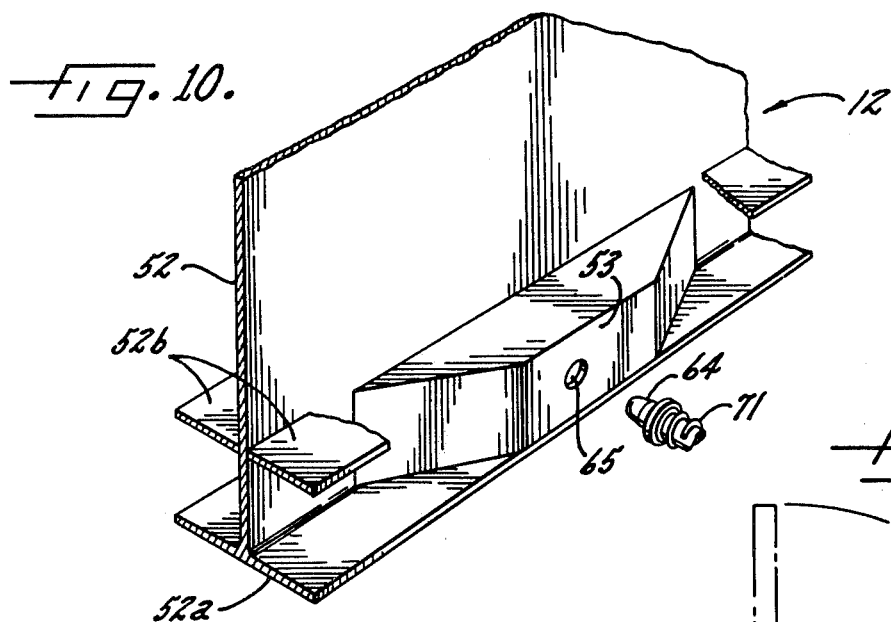
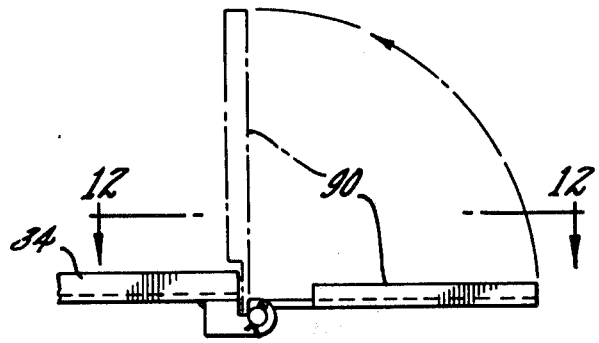
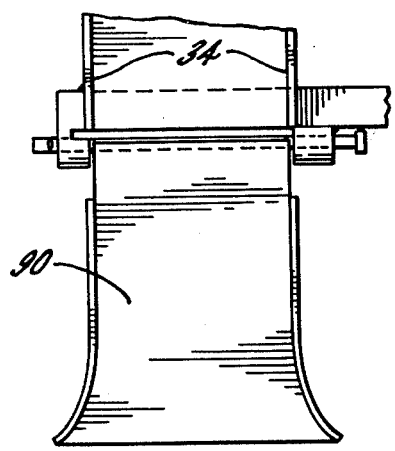
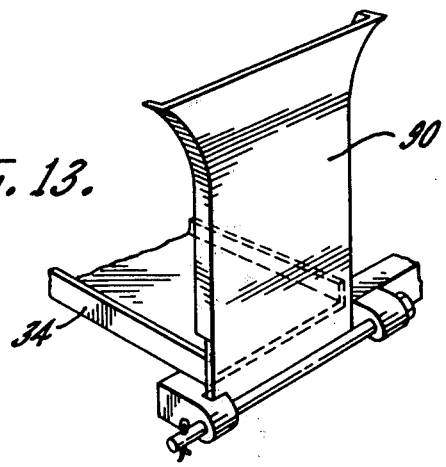
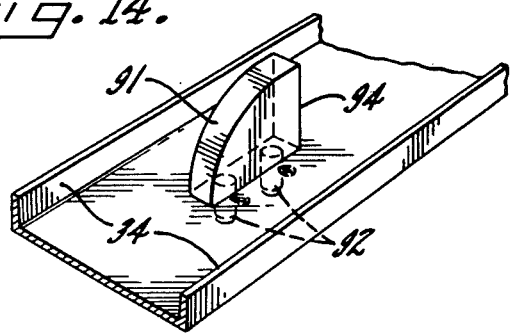
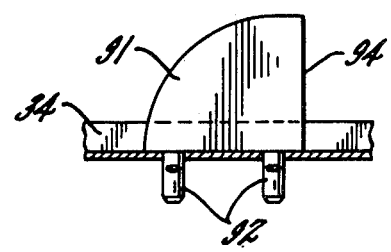

METHOD OF UNLOADING CONTAINER FROM TRANSPORT VEHICLE

DESCRIPTION OF THE INVENTION

This is a division of application Ser. No. 410,344 filed Oct. 29, 1973 now U.S. Pat. No. 3,934,740.

The present invention relates generally to trucks having removable cargo containers, and more particularly, to a system for loading and unloading such containers.

In the past several years, considerable interest has developed in the transportation of "intermodal" containers. These containers are designed for transport by truck or rail to a loading dock, such as a shipyard. At present, virtually all commercially suitable intermodal containers that are carried by truck must be loaded and unloaded by expensive lifting equipment such as cranes or the like. Such lifting equipment is not only a substantial capital investment, but also requires specially trained workmen to operate the equipment. As a result, if a driver reaches a destination for pickup or unloading of his cargo container at a time when the workmen are not on duty, he must wait until the following day before he can effect a transfer or pickup of his load.

It is an object of the present invention to provide a method for more rapidly and easily removing a reusable cargo container from a truck chassis without special lifting equipment.

Another object is to provide a method of the above kind by which the driver of the truck may himself readily unload the cargo container from his truck and reload another container.

Other objects and advantages of the invention will become apparent as the following description proceeds, taken in conjunction with the accompanying drawings, in which:

FIG. 1 is a perspective of a truck with its chassis positioned for unloading a cargo container in accordance with the present invention;

FIG. 2 is a side elevational view of the illustrated truck with the rear tandem wheels shown in solid lines in their transport position and in phantom lines at a position for supporting the chassis immediately prior to the chassis being moved to a container unloading position;

FIG. 3 is a side elevational view of the illustrated truck with its chassis tandem wheels at a central cantilever location and the chassis tilted to a position for unloading a container to ground level;

FIG. 3a is a side elevational view of the truck shown in FIG. 3, but with the chassis support tandem located at a rearward location and the chassis tilted to a position for unloading a container onto an elevated loading platform;

FIG. 4 is an enlarged top plane view of the chassis of the truck shown in FIG. 2 with the container removed;

FIG. 5 is an enlarged fragmentary section taken in the plane of line 5—5 in FIG. 3;

FIG. 6 is an enlarged vertical section taken in the plane of line 6—6 in FIG. 4;

FIG. 7 is an enlarged fragmentary section taken in the plane of line 7—7 in FIG. 6;

FIG. 8 is an enlarged fragmentary section taken in the plane of line 8—8 in FIG. 7;

FIG. 9 is a fragmentary section taken in the plane of line 9—9 in FIG. 8;

FIG. 10 is an enlarged perspective illustrating the releasable locking pin arrangement for securing the rear wheel tandem of the illustrated truck to the chassis to prevent relative sliding and pivotable movement;

FIG. 11 is an enlarged side elevational view of the drop-ramp at the rear of the illustrated chassis, shown in solid lines in its unloading position and in phantom in its transport portion;

FIG. 12 is a plan view of the drop-ramp shown in FIG. 11 taken in the plane of line 12—12;

FIG. 13 is a perspective of the drop-ramp in vertical transport position;

FIG. 14 is a partial perspective of one of the stop members for limiting relative movement of the containers on the chassis; and FIG. 15 is an enlarged side elevational view of the stop member shown in FIG. 14.

Figure 6A:
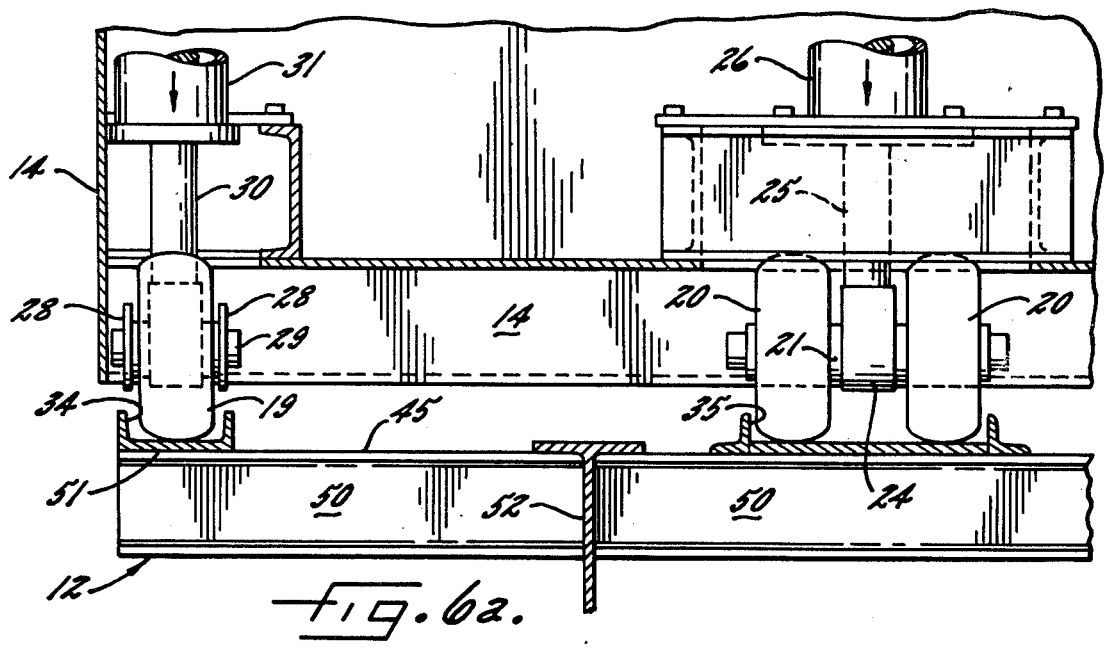
FIG. 6a is an enlarged fragmentary section of the chassis with the container supported thereon in a raised mobilized condition.

While the invention is susceptible of various modifications and alternative constructions, a certain illustrative embodiment thereof has been shown in the drawings and will be described below in more detail. It should be understood, however, that there is no intention to limit the invention to the specific form disclosed, but, on the contrary, the intention is to cover all modifications, alternative constructions, and equivalents falling within the spirit and scope of the invention.

Referring more particularly to the drawings, there is shown an illustrative cargo transport truck 10 which may be loaded and unloaded in accordance with the present invention. The truck 10 comprises a tractor 11 and a chassis 12 that supports one or more removable and reusable freight hauling and shipping containers 14. The tractor includes a rear extension 15 to which the chassis 12 may be releasably connected through a conventional king pin coupling 16 to permit the tractor to pull the chassis. As is conventional, the tractor 11 has a front set of wheels 17 and two sets of wheels 18 at the rear extension 15.

The container 14 preferably is of the type disclosed in applicant's co-pending application, Ser. No. 269,978 filed July 10, 1972 now U.S. Pat. No. 3,788,638. The container 14 is rectangular shaped and has extensible and retractable support dollies 19, 20 adapted to convert the container from an immobile frame based storing container to a mobile wheeled hauling container for easy placement onto and removal from the chassis flatbed 12. In the illustrated container, first and second support dollies 19 are located near the base corners at one end of the container and a third pivotable support dolly 20 is located near the center of the base at the other end of the container. The dolly 20 in this case includes a pair of dolly wheels journaled on a common axle 21 and spaced laterally apart so that an intermediate portion of the axle can be journaled to an ear 24. The ear 24 is connected to a shaft 25 mounted on the piston of a hydraulic cylinder 26 supported within the container. The dollies 19 each comprise a pair of wheels interconnected in longitudinally spaced relation by brackets 28 secured to the respective wheel shafts 29. The brackets 28 are mounted to the lower end of a depending piston rod 30 of a hydraulic cylinder 31 also supported within the container. The dollies 19, 20 each are recessed within the outer periphery of the container 14 to permit close positioning of several containers.

It will be understood that while the illustrated truck 10 is shown with a single cargo container 14, alternatively two smaller sized containers 14a, 14b could be carried by the chassis 12, as shown in phantom in FIGS. 2 and 3. In such case, the containers preferably would be releasably connected through appropriate hitches provided at opposite ends of the container. Preferably the chassis 12 is of such length as to accommodate a single 40 foot length container, or two 20 foot length containers positioned in spaced end to end relation.

To extend and retract the dollies 19, 20, the container has a self-contained hydraulic system for operation of the hydraulic cylinders 26, 31. The hydraulic system includes a hydraulic pump, a hydraulic fluid reservoir, and a low voltage direct current motor all contained within the container as described in the applicant's aforesaid co-pending application. Upon energization of the motor, such as by a self-contained 12 volt battery, the pump supplies pressurized fluid to the three hydraulic cylinders 26, 31 via appropriate conduits to cause the piston rods 25, 30 to be moved downward and thereby raise the container so that it is supported by the dollies.

Figure 6B:
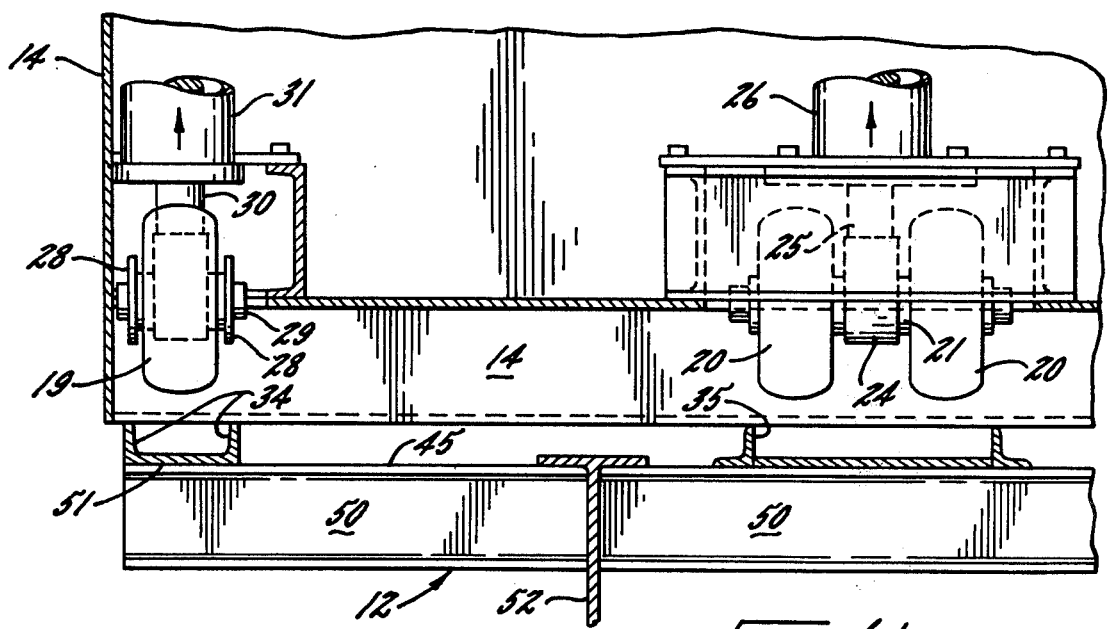
FIG. 6b is a fragmentary section similar to FIG. 6a, but showing the container in a lowered immobile position.

For guiding rolling movement of the container 14 along the chassis 12 when the dollies are extended, longitudinally extending guide tracks 34, 35 in the form of upturned channels are provided on the upper surface of the chassis within which the dollies 19, 20 respectively, of the container are received. Since the guide tracks 34 receive the longitudinally aligned corner wheels 19 of the container in this case, they are narrower than the central guide tracks 35 that receive the laterally spaced dolly wheels 20 at the center of the opposite end of the container. As shown in FIG. 6a, when the dolly wheels 19, 20 are in their fully extended position, they extend below the base of the container to lift and thereby support the base of the container above the guide tracks. The container 14 is then in a mobilized condition and the guide tracks 34, 35 will guide movement of the container longitudinally along the chassis. When the dolly wheels 19, 20 are drawn to their retracted position, as shown in FIG. 6b, it will be seen that the wheels terminate above the bottom level of the container base causing the container to rest on the guide tracks 34, 35 in an immobile condition.

Figure 6C:
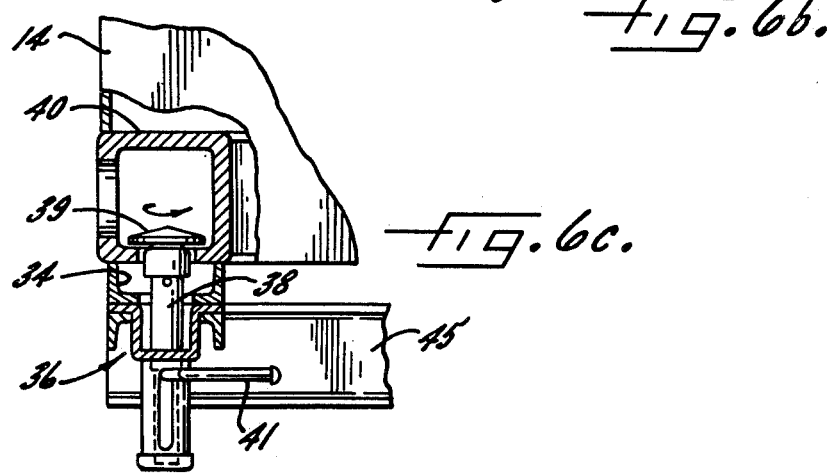
FIG. 6c is a fragmentary section of one of the twist locks for releasably securing a container onto the flatbed of the illustrated truck chassis.

To lock the containers 14 to the chassis in its immobile condition for transport, twist locks 36 are located below the guide tracks 34, 35 for securing each corner of a container positioned thereon, as shown in FIG. 6c. The illustrated twist locks 36 each have a vertical stem 38 with an elongated head 39 at the upper end thereof. Each bottom corner of the container 14 has a corner casting 40 formed with a suitable elongated bottom aperture adapted to receive a respective one of the twist lock heads 39. The stem 38 is supported below the track for relative rotational and axial movement, and preferably is biased in an upward direction by a suitable spring means not shown. A handle 41 is connected to the stem to facilitate such movement. As will be apparent, the container may be placed upon the chassis so that each corner casting 40 is positioned over one of the twist locks 36. By then raising the twist lock head 39 into the corner casting and rotating it to a transverse position relative to the corner casting slot by means of the handle 41, the head will lock the container 14 on the chassis 12. Suitable means, such as a spring detent, not shown, is provided for securing the stem 38 in a retracted position when the container is being removed or placed in position.

The chassis 12 comprises a flatbed 45 supported on a tandem 46 having two sets of wheels 48a, 48b. The flatbed 45 has a structural beam construction includng a plurality of I beam cross members 50 interconnected by longitudinal structural members 51. A frame 52 depending from the underside of the flatbed 45 supports the flatbed on the tandem 46. To provide support for the forward end of the chassis 12 in the event that it is detached from the tractor 11, a pair of extensible support legs 54 of a known type are secured to the underside of the flatbed.

Each set of tandem wheels 48a, 48b are supported on a respective axle 55a, 55b. The axles 55a, 55b in this case are connected together in spaced relation by a pair of leaf spring assemblies 56 of a conventional type. As shown in FIG. 6, a tandem axle 58 is rotatably supported under the leaf spring assemblies 56 and centrally between the wheel axles by a pair of U-bolt bearing brackets 59 that each engage one of the spring assemblies 56 and support an end of the tandem axle 58 for relative rotational movement. A rectangular boxlike tandem frame 60 is mounted on the tandem axle 58 by a pair of support brackets 61 fixed to the tandem axle immediately adjacent the U-bolt bearing brackets 59. It will be understood that the tandem wheels 48a, 48b are provided with a conventional brake system, not shown, that is operable from the tractor.

In accordance with the invention, the chassis flatbed is selectively positionable relative to its tandem support and may be tilted on the tandem to permit a cargo container supported thereon to be moved longitudinally off of the flatbed at either ground level or at an elevated loading platform. To this end, the tandem frame 60 is provided with laterally extending support members 63 that extend the length of the frame 60 on its opposite sides and upon which longitudinal bottom plates 52a of the flatbed frame 52 ride. To facilitate relative sliding movement between the flatbed frame plates 52a and the trunion support members 63, a plurality of wear plates 67 are mounted on the trunion support members 63. For strengthening the flatbed frame 52 and guiding its sliding movement relative to the tandem frame 60, transverse flanges 52b are mounted on the support frame 52 in spaced relation above the bottom plate 52a and immediately adjacent the upper corner of the tandem frame 60. An L-shaped clamp 73 is secured to the side of each trunion support member 63 by bolt 73a and has a flange overlying in closely spaced relation the flatbed frame bottom plate 52a for preventing the bottom plate 52a against lifting movement from the support member 63.

In order to releasably lock the tandem 46 to the flatbed 45 to prevent relative sliding movement therebetween during transport of the chassis, a selectively operable locking pin mechanism 62 is provided on the front side of the tandem frame 60. The locking mechanism 62, as best shown in FIGS. 7, 9, and 10, includes a pair of oppositely disposed pins 64 that are engagable in respective apertures 65 in the flatbed frame 52 when the tandem 46 supports the flatbed 45 at its travel position. The apertures 65 are formed in a vertical panel 53 protruding inwardly from each wall of the flatbed support frame 52. The locking pins 64 each are fixed at the end of a connecting rod 66 which in turn is connected to a rotary link 68 carried on a shaft 69 supported within a frame plate 70. The pins 64 in this instance are outwardly biased by springs 71 toward their locking positions. By pulling a handle 72, the rotary link 68 may be rotated to withdraw the pins from the apertures 65 against the biasing force of the springs 71. A notch 74 in the connecting linkage for the mechanism is engagable with a stationary plate 75 on the locking mechanism 62 for securing the locking pins 64 in their unlocked position which permits sliding movement of the flatbed relative to the tandem, as will become apparent. A second notch 76 is engagable with the stationary plate 75 for positively maintaining the pins 64 in their locked positions, as shown in FIG. 9.

In keeping with the invention, upon disengagement of the locking pins 64, the flatbed 45 may be moved to a central cantilever position over the tandem 46 and tilted to lower the rearward end of the flatbed to ground level, as shown in FIGS. 1 and 3. To this end, the brakes for the tandem wheels 48a, 48b are first locked to prevent their rotational movement, and then by backing the cab in a rearward direction, the flatbed 45 is then moved rearwardly relative to the tandem support 46 until it reaches a centered position over the tandem. To facilitate locating such position, a stop member 78 is mounted on the underside of the flatbed frame 52 which engages the stationary tandem.

To tilt the flatbed 45 relative to the tandem 46, a pair of hydraulically actuated cylinders 80 are interposed between the tractor extension 15 and the forward end of the flatbed 45. The cylinders 80 are pivotably mounted at one end to a frame 81 located over the king pin connection 16 and each have a piston rod 82 pivotably connected at its outer end to the underside of the flatbed 45. A plurality of lifting and support arms 84 are provided on opposite sides of each of the cylinders 80 and are pivotably connected at their opposite ends to the frame 81 and flatbed 45. It will be understood that the frame 81 is detachably secured to the truck extension to permit its removal therefrom when the chassis is disconnected. As shown in phantom in FIGS. 2 and 3, when the flatbed is in its horizontal position, the support arms 84 are substantially horizontal and are received between the longitudinal flatbed support members 51. At the same time, the hydraulic cylinders 80 with their piston rods retracted are disposed at an angle to the horizontal.

For operating the hydraulic cylinders 80 to lift the flatbed 45, the tractor 11 has a fluid reservoir and a power take-off operated from a console 85 adapted to supply pressurized fluid through the lines 86 to extend the piston rods 82. As the piston rods 82 are extended, the hydraulic cylinders 80 in cooperation with the lifting of support arms 84 cause the forward end of the flatbed 45 to be elevated. Since the tandem wheels remain braked at this time, the raising of the front end of the flatbed 45 causes the tractor 11 to be pulled rearwardly a short distance from its original position, shown in phantom in FIG. 3. It will be seen that since the flatbed is tilted about a single center point suspension, lifting of the flatbed does not require excessive force, particularly if the container mounted thereon is loaded with a relatively uniform weight distribution. In practice it has been found that hydraulic cylinders with 80,000 pounds lifting capacity will operate reliably and satisfactorily in lifting the end of the flatbed.

After the flatbed 45 has been tilted so that its rearward end is at ground level, the container 14 with its support dollies 19, 20 in their extended positions may be rolled longitudinally off the end of the flatbed onto the ground. To guide and control such rolling movement, a rope 88 of a hydraulic actuated winch 89 mounted on the tractor 11 is connected to the forward end of the container 14. The winch 89, preferably having a load capacity of about 65,000 pounds, is controlled by the hydraulic console 85 to allow the container to gradually roll off the flatbed 45 under the force of gravity. It will be understood that the container twist locks 36 may be released and the dollies 19, 20 extended, either before or after the flatbed 45 has been tilted since it is under the firm control of the winch 89.

To facilitate moving the container off the end of the flatcar, a pivotable ramp 90 is mounted at the end of each guide track 34. The ramp 90 is pivotable between an upright travel position shown in FIG. 13 and an outwardly extended unloading position shown in FIGS. 3 and 12. An appropriate locking or latching mechanism may be provided for releasably maintaining the ramp in the upright position.

When the container 14 has been removed from the flatbed, the winch rope 88 may be disconnected and attached to another container for loading onto the flatbed through operation of the winch. Removable stop members 91 in this case, are supported in the tracks 34 for establishing the exact location of a container 14 positioned on the flatbed so that the twist locks 36 will reliably engage the container corner castings 40. The stop members 91 each have a pair of lugs 92 that are engagable with apertures formed in each track 34 and vertical surface 94 for engaging the forward end of a container that is moved against it.

After the new container or containers have been loaded on the flatbed 45, the hydraulic cylinders 80 may be operated to lower the forward end of the flatbed 45 to its horizontal travel position shown in FIG. 2. The tractor 11 may then be driven forwardly to again move the flatbed 45 relative to the stationary tandem 46 until the tandem is at its rearward travel position. At that point, the locking pin mechanism may be actuated to permit the locking pins 64 to re-engage the flatbed frame apertures. Once in position on the flatbed, the container dollies 19, 20 may be retracted and the ramp 90 raised.

In keeping with the invention, the flatbed 45 may be positioned over the tandem 46 and tilted so that the rearward end of the flatbed is adjacent a raised loading dock or ramp. In FIG. 3a, the flatbed 45 is shown being tilted about the tandem 46 when it is located at its rearward travel position. In such case, it is still necessary to disengage the locking pins 64 from the flatbed frame 52 to permit the flatbed to be pivoted about the tandem axle 58. When the flatbed is pivoted with the tandem in such a rearward position, it can be seen that the flatbed is still tilted at an angle with respect to the horizontal so that the container 14 mounted thereon may be rolled longitudinally off the end of the flatbed under the force of gravity and guidance of the hydraulic winch 89, but that the rearward end remains elevated to the height of a loading dock. Again, the ramps 90 are lowered prior to unloading of the container to bridge any slight gap between the end of the flatbed and the ramp and to compensate for slight differences in elevation.

In the event that two containers 14a, 14b are to be loaded on the tilted flatbed 45 rather than a single large container, the first container 14a may be drawn into position against the permanent stop 95 by the winch 89, its support dollies 19, 20 retracted, and the container locked in place. The winch rope may then be passed under the container 14a through the central guide track 35 and connected to the second container 14b which can then be drawn into loading position onto the flatbed. A similar procedure may be used in unloading the two containers. Alternatively, of course, the two containers may be coupled together and simultaneously loaded and unloaded on the tilted flatbed.

To summarize the steps of unloading the cargo container 14 from the truck 10 in a typical case, the truck would arrive at its destination with its chassis in a horizontal transport position, as shown in FIG. 2 in solid lines. The truck would be maneuvered so that the rear end of the chassis 12 is adjacent the desired location for placement of the container 14. The locking mechanism 62 would then be operated to withdraw the locking pins 64 from the flatbed frame apertures 65, thereby freeing the flatbed 45 for subsequent sliding and pivotable movement relative to the tandem 46. By braking the tandem wheels 48a, 48b and then by backing the tractor 11 rearwardly until the fixed stop 78 is engaged by the tandem, the flatbed 45 is centered in cantilever position over the tandem 46. The flatbed then may be tilted about the single tandem axle 58 by operation of the hydraulic cylinders 80 until the rearward end of the flatbed is at ground level. During such tilting of the flatbed, since the tandem wheels remain locked, the scissoring effect of the hydraulic cylinders 80 and support arms 81 causes the tractor to be drawn rearwardly a short distance, as shown in FIG. 3.

After the guide ramps 90 have been lowered and the container unlocked and its dollies 19, 20 extended, the winch may be operated to gradually permit the container to roll off the flatbed under the force of gravity. After the container has been removed from the area of the truck, a new container may be drawn onto the tilted flatbed by the winch 89. The stop 91 will establish the position where the container may be lowered onto the tracks 34, 35 and secured thereto by the twist locks. The hydraulic cylinders 80 may then be operated to draw the flatbed to its horizontal transport position, and the tractor 11 driven forward until the flatbed 45 is again located over the tandem 46 in its travel position. The locking mechanism 62 is then engaged to positively lock the tandem to the flatbed frame and complete the transfer.

From the foregoing, it will be appreciated that the method of the present invention permits quick transfer of relatively large heavy cargo containers between the truck chassis on which it is mounted and a loading platform or work area without the need for expensive special lifting equipment as heretofore been customarily required. Moreover, such unloading or reloading may be effected by the driver of the truck so as to reduce labor costs incident to the transfer operation, as well as eliminating the need for timing such transfers when crane operators are on duty.

I claim as my invention:

1. A method of unloading a cargo container having retractable and extensible support wheels from a transport vehicle having a tractor and a detachable chassis supporting said cargo container, said chassis having a flatbed mounted on a pivot support of a wheeled tandem for relative pivotal and longitudinal movement with respect to said tandem and pivot support comprising the steps of:
   a. slidably moving said flatbed in a longitudinal direction relative to said tandem pivot support so that said tandem is located at any desired longitudinal location along a length of said flatbed,
   b. extending said container wheels to elevate said container relative to said flatbed and support said container for rolling movement,
   c. tilting said flatbed about said tandem pivot support to a desired angular position relative to the horizontal, and
   d. moving said cargo container longitudinally off the end of said flatbed while said container wheels are in an extended container supporting position.

2. The method of claim 1 including moving said flatbed to a substantially centered cantilever position over said tandem, and tilting said flatbed to lower the rearward end thereof to ground level.

3. The method of claim 2 in which said container is moved off said tilted flatbed to ground level under gravity force.

4. The method of claim 1 including moving said flatbed to locate a rearward portion thereof over said tandem, and tilting said flatbed to position the rearward end thereof to an elevated loading platform.

5. The method of claim 1 including braking the wheels of said tandem against rotary movement prior to slidably moving said flatbed relative to said tandem, and moving said flatbed relative to said tandem by backing said tractor rearwardly with said flatbed attached and said tandem wheels braked.

6. The method of claim 5 including backing said tractor relative to said tandem until said tandem engages a positive stop on said flatbed.

7. The method of claim 1 including returning said flatbed to its original untilted position after said container has been removed, moving said flatbed to a travel position over said tandem, and locking said flatbed against sliding and tilting movement with respect to said tandem.

8. The method of claim 1 including controlling movement of said container off said flatbed by a winch rope secured to said container.

9. The method of claim 1 including loading another container on said flatbed after the container originally mounted thereon has been moved off said flatbed by connecting said winch rope to said other container and drawing said container longitudinally onto said flatbed while in a tilted condition.

10. The method of claim 9 including loading a second container on said flatbed after said other container has been positioned thereon by passing said winch rope under said other container and connecting it to said second container, and operating said winch rope to draw said second container longitudinally onto said flatbed to a position immediately behind said other container.

11. The method of claim 1 including supporting two containers on said flatbed, and simultaneously moving said containers off said flatbed when in a tilted unloading position.

* * * * *